(12) United States Patent
Brewington (10) Patent No.: US 6,661,978 B2
(45) Date of Patent: Dec. 9, 2003

(54) METHOD AND APPARATUS FOR AUTOMATED JOB RECOVERY

(75) Inventor: Grace T. Brewington, Fairport, NY (US)

(73) Assignee: Xerox Corporation, Stamford, CT (US)

(*) Notice: Subject to any disclaimer, the term of this patent is extended or adjusted under 35 U.S.C. 154(b) by 129 days.

(21) Appl. No.: 10/046,151

(22) Filed: Jan. 16, 2002

(65) Prior Publication Data

US 2003/0133721 A1 Jul. 17, 2003

(51) Int. Cl.⁷ ............................................. G03G 15/00
(52) U.S. Cl. ........................................................ 399/19
(58) Field of Search ............................ 399/14, 15, 18, 399/19, 20, 49, 72

(56) References Cited

U.S. PATENT DOCUMENTS

| | | | | |
|---|---|---|---|---|
| 4,335,952 A | * | 6/1982 | Conly et al. | 399/11 |
| 4,497,569 A | * | 2/1985 | Booth, Sr. | 399/20 |
| 5,045,881 A | * | 9/1991 | Kinder et al. | 399/20 |
| 5,179,410 A | | 1/1993 | Farrell et al. | |
| 5,287,162 A | | 2/1994 | de Jong et al. | |
| 5,343,275 A | * | 8/1994 | Sulenski | 399/9 |
| 5,489,968 A | * | 2/1996 | Rossbach et al. | 399/20 |
| 5,576,811 A | * | 11/1996 | Kobayashi et al. | 399/60 |
| 5,748,221 A | | 5/1998 | Castelli et al. | |
| 6,181,888 B1 | * | 1/2001 | Scheuer et al. | 399/49 |
| 6,204,869 B1 | | 3/2001 | Raker et al. | |

FOREIGN PATENT DOCUMENTS

JP  07334042 A  * 12/1995  .......... G03G/21/00

OTHER PUBLICATIONS

U.S. patent application Ser. No. 09/450,180, Rasmussen et al., filed Nov. 29, 1999.
U.S. patent application Ser. No. 09/450,181, Rasmussen et al., filed Nov. 29, 1999.
U.S. patent application Ser. No. 09/450,182, Rasmussen et al., filed Nov. 29, 1999.
U.S. patent application Ser. No. 09/450,184, Dalal et al., filed Nov. 29, 1999.
U.S. patent application Ser. No. 09/450,185, Rasmussen et al., filed Nov. 29, 1999.

* cited by examiner

Primary Examiner—Robert Beatty
(74) Attorney, Agent, or Firm—Oliff & Berridge, PLC (57) ABSTRACT

A dynamic job recovery system for an electronic reprographic printing system provides warranted performance by monitoring and ensuring variable data job integrity and consistent output appearance through close control of image quality and content integrity. The system monitoring the performance of a particular attribute indicative of one of image quality and variable data content integrity, preferably with real-time control, with one or more warranted performance sensors while in a customer print job mode. If monitored attributes are within desired specification and integrity, processing of the customer print job is continued. A warranted performance fault action is conducted if one or more attributes are out of range. When this occurs, print sheets in progress are purged to a purge tray (those with compromised integrity or quality and upstream incomplete sheets). Then, a diagnostic routine is initialized without machine cycle down to identify sources of the fault. If automatic recovery is possible, such job recovery is initiated upon completion of diagnostic testing to resume customer print job where it left off to provide a complete print job with warranted performance without operator intervention.

25 Claims, 9 Drawing Sheets

METHOD AND APPARATUS FOR AUTOMATED JOB RECOVERY

BACKGROUND OF THE INVENTION

1. Field of Invention

The present invention relates to an electronic printing system that performs printer dynamic job recovery without any loss in job integrity. More particularly, the invention relates to an electronic printing system that ensures warranted performance of a customer print job through monitoring of variable data integrity identifiers and image quality attributes during print job production.

2. Description of Related Art

Electronic printing systems, including printers and reprographic devices such as digital copiers are known. In electronic printers, information forming documents to be printed are provided in electronic form to the printer. This electronic information can come from many sources, including, for example, a scanner, created by a software program, retrieved from a storage medium, or supplied from a computer or computer network. In electronic reprographic printing systems, a document or series of documents comprising at least one print job are successively scanned. Upon scanning of the documents, image signals are obtained and electronically stored. The signals are then read out successively and transferred to a printer for formation of the images on paper. Once a document is scanned, it can be printed any number of times or processed in any number of ways (e.g., words deleted or added, image magnified or reduced, etc.). If a plurality of documents comprise a job which is scanned, the processing or manipulation of the scanned documents can include deletion of one or more documents, reordering of the documents into a desired order, or addition of a previously or subsequently scanned document or documents. The printing or processing can be relatively synchronous with scanning, or asynchronous after scanning. If asynchronous, a time interval exists between scanning and printing or processing. The system can then accumulate a number of scanned jobs in the system memory for subsequent processing or printing. The order of the jobs to be printed may be different from the order of jobs as scanned depending on the priority of the jobs and the desires of the operator for increasing productivity or through-put and decreasing printer or scanner down-time.

For a variety of reasons, the printed job produced by the electronic printing system may have a lack of integrity. There have been limited attempts to remedy the presence of print jobs with questionable integrity. One known prior art system, U.S. Pat. No. 5,179,410 assigned to Xerox Corporation, the disclosure of which is incorporated by reference herein in its entirety, achieves automatic job recovery from limited integrity failures.

In particular, the '410 patent teaches a method and apparatus for dynamic job recovery that includes the steps: automatically detecting the presence of a printed sheet having an image thereon with a relative loss of integrity; automatically purging specified sheets to a specified location upon detection; awaiting delivery of the purged sheets at the specified location; and initiating a dynamic job recovery as soon as all specified sheets have been delivered, this last step being performed without cycling down and without operator intervention. Integrity failures disclosed in the '410 patent include those caused by a general system fault, a Raster Output Scanner fault causing a failure to image properly (video image loss), paper misfeed or misregistration, and a lack of communication between the Raster Output Scanner and control system (also resulting in video image loss).

SUMMARY OF THE INVENTION

While limited job recovery can be performed using known systems, the uses of such are limited to basic system faults, and not specifically pertaining to variable data jobs, the integrity of which cannot fully be appreciated from basic system fault sensors.

There is a need for a dynamic job recovery system for an electronic printing system that provides warranted performance by monitoring and ensuring variable data content integrity and consistent output appearance by closely controlling image quality and content integrity.

The systems and methods of the invention provide an electronic printing system which performs job recovery from variable data job integrity faults without requiring operator attention. Variable data job integrity in this context includes ensuring images on the print job pages for static documents are valid and that each unique document page has the correct contents of variable data.

Various embodiments of the systems and methods of the invention also provide an electronic printing system which performs job recovery by sensing integrity indicators and performing dynamic job recovery when such indicators suggest image quality performance or variable data content that is improper.

Various exemplary embodiments of the systems and methods of the invention also provide an electronic printing system that maintains output appearance by monitoring image quality attributes during customer job processing and performs job recovery upon sensing of a warranted performance problem, such as an image quality parameter being below a desired standard.

Exemplary embodiments of the systems and methods of the invention are provided with one or more warranted performance sensors that sense job integrity indicators.

Various exemplary embodiments of the systems and methods of the invention may include one or more warranted performance sensors that sense individual sheet glyphs.

Various exemplary embodiments of the systems and methods of the invention may include one or more warranted performance sensors that sense glyphs or color patches in interpage zones of the marking engine.

Various exemplary systems and methods of the invention may provide job recovery from various image quality attribute or integrity faults, such as, for example, color-to-color registration error, color uniformity being out-of-range, color stability being out-of-range, page content integrity fault, paper feed timing mismatch with delivery of image data, double feed, or other attributes indicative of the integrity and quality of the contents being printed for a particular sheet of a customer print job.

Exemplary systems and methods of the invention also provide an electronic reprographic system which performs job recovery by redirecting all sheets of questionable variable data content integrity or image quality to a purge destination and recovering to the correct sheet in the job without requiring any operator attention.

Exemplary systems and methods of the invention provide an electronic reprographic system that provides warranted performance and automated job recovery during processing of a customer print job by: monitoring the performance of a particular attribute indicative of one of image quality and variable data content integrity, preferably with real-time control, with one or more warranted performance sensors while in a customer print job mode; continuing processing of the print job if all attributes are within desired specifications; executing a warranted performance fault action if one or more attributes are out of range; diverting print sheets in progress to a purge tray (those with compromised integrity or quality and upstream incomplete sheets); initiating a diagnostic mode without machine cycle down to identify and correct sources of the fault; and initiating automatic job recovery if possible upon completion of diagnostic testing to resume customer print job where it left off to provide a complete print job with warranted performance without operator intervention.

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

Figure 1:
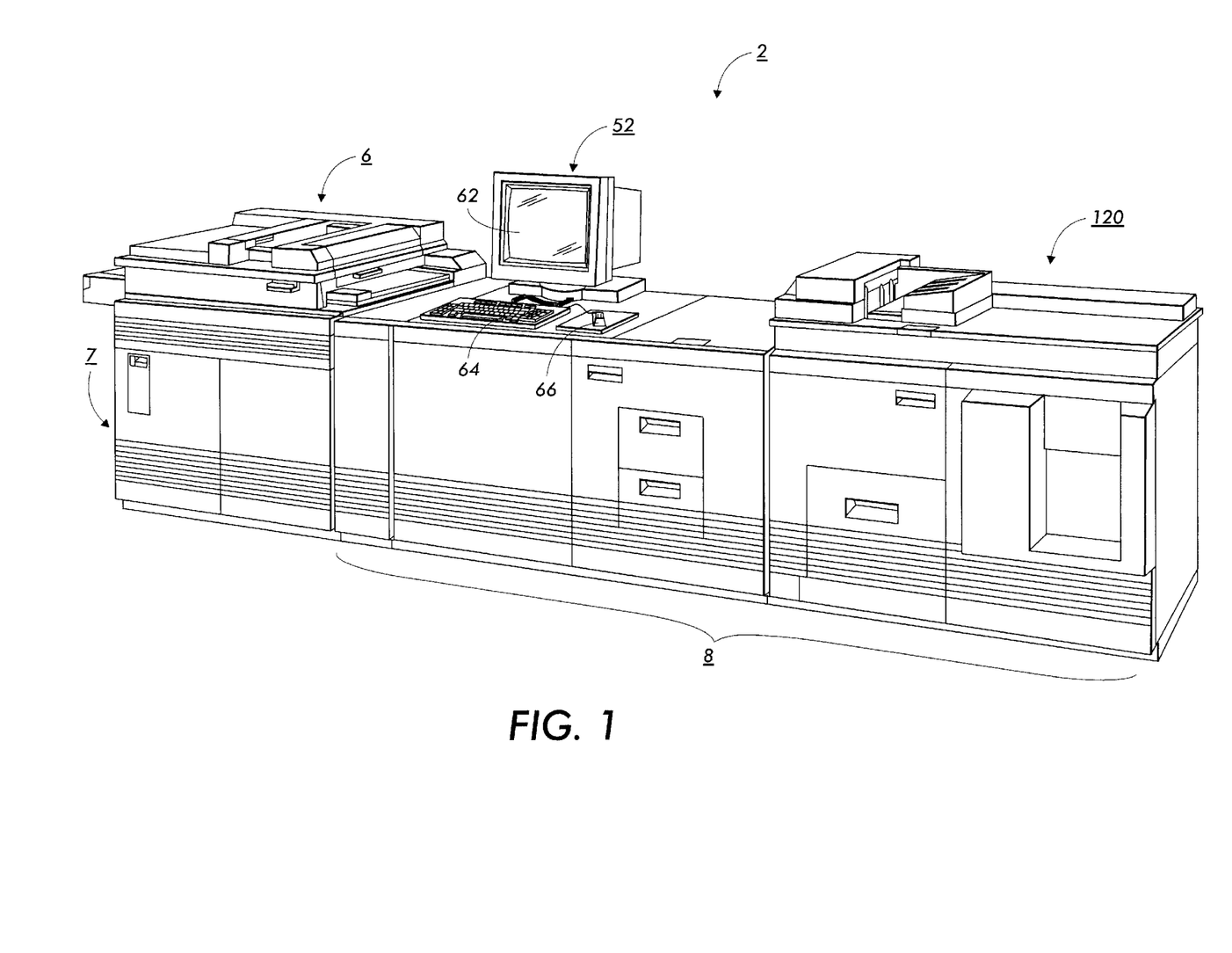
FIG. 1 is a view depicting a single color electronic printing system incorporating warranted performance sensors and a dynamic job recovery system of the present invention.
Figure 2:
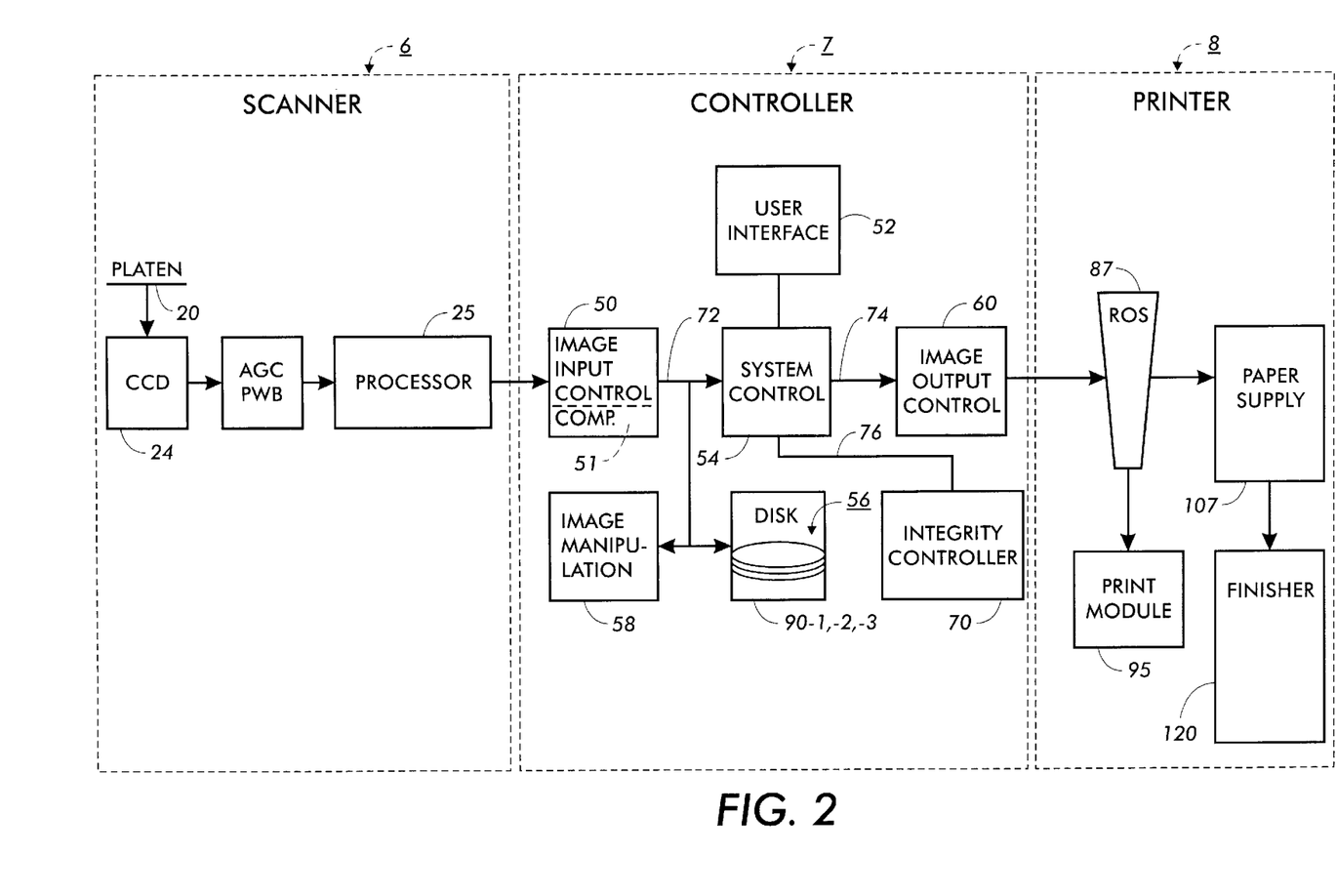
FIG. 2 is a block diagram depicting the major elements of the printing system shown in FIG. 1.
Figure 3:
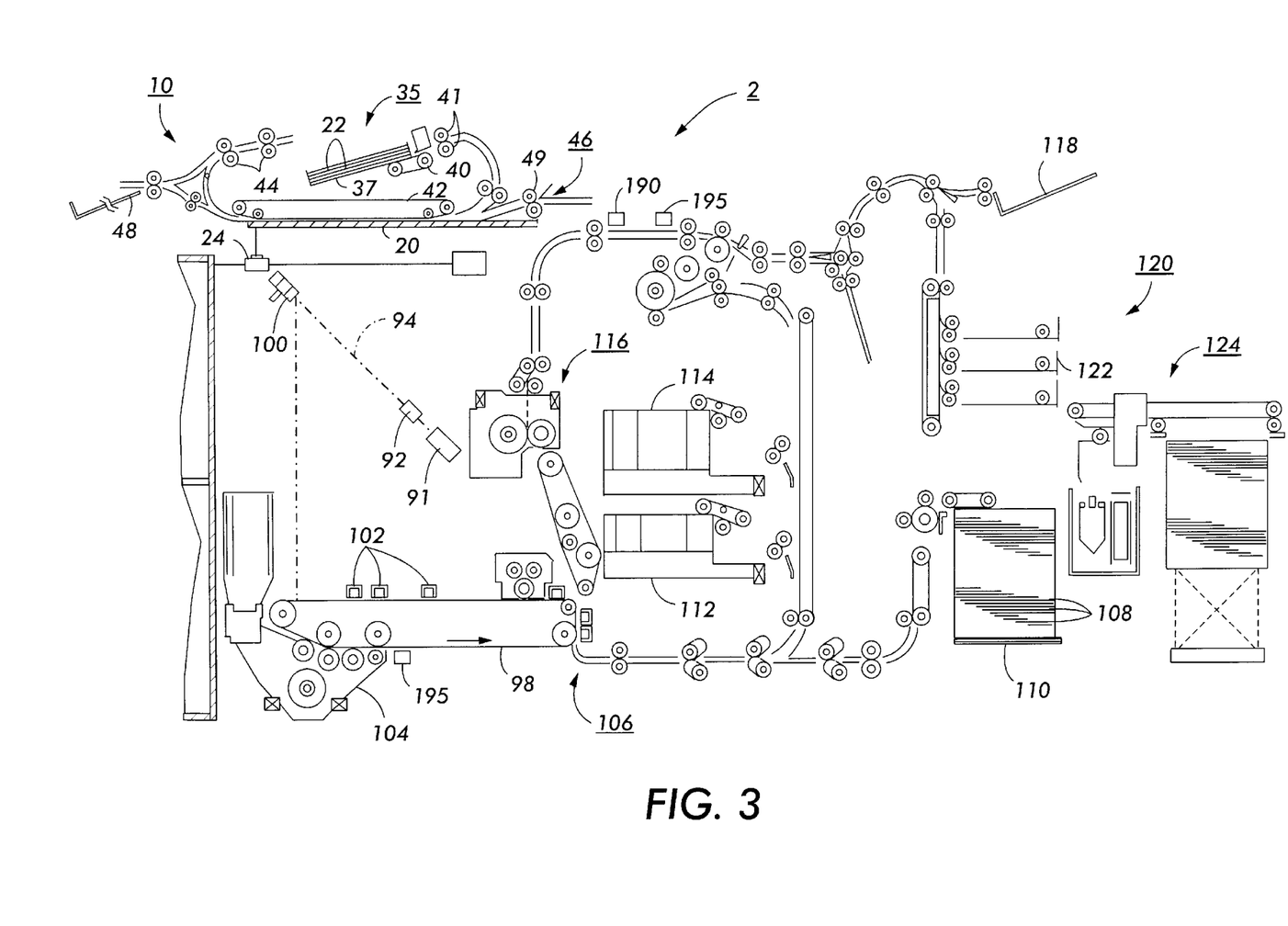
FIG. 3 is a plan view illustrating the principal mechanical components of a single color printing system shown in FIG. 1.
Figure 4:
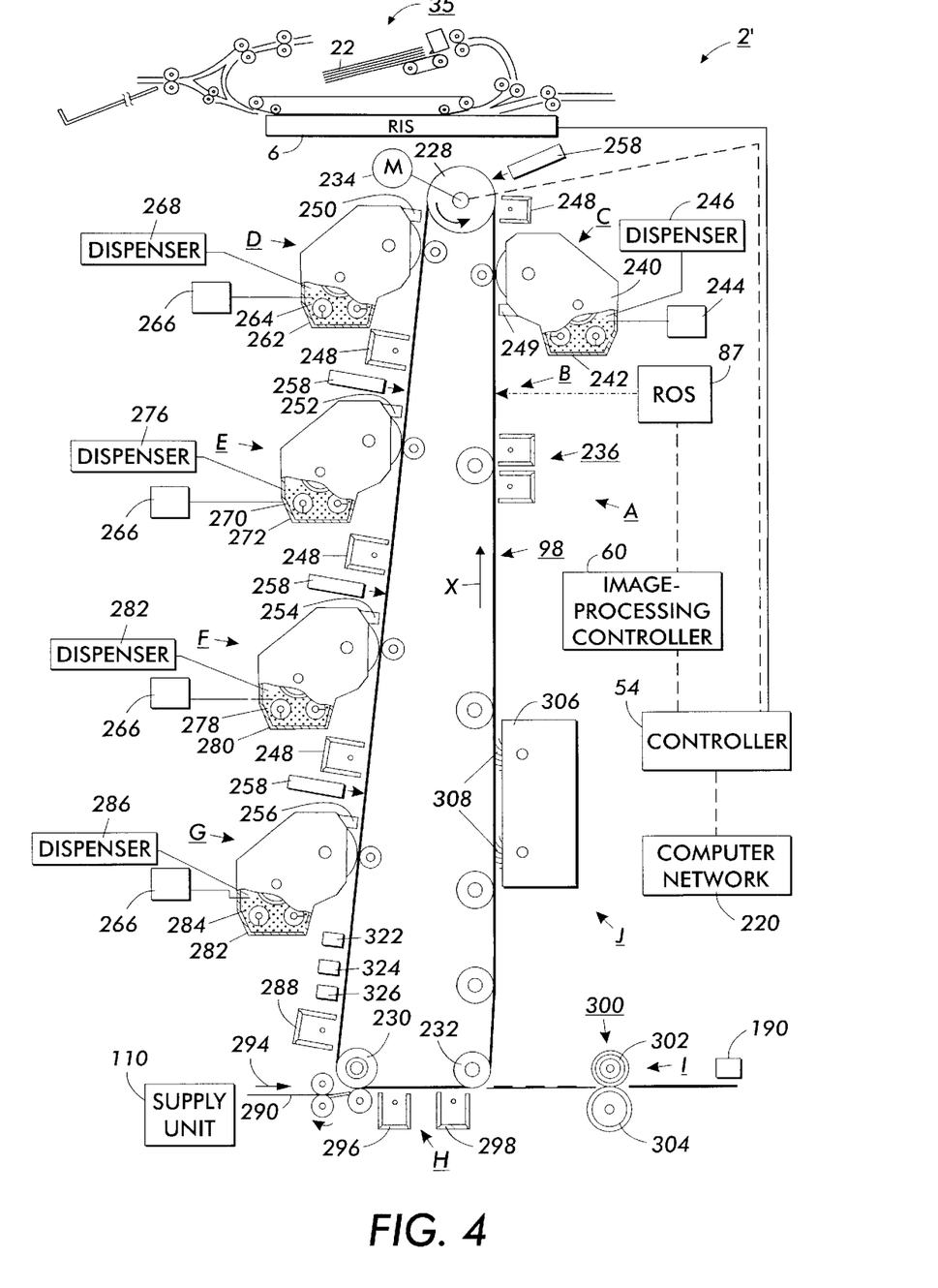
FIG. 4 is a view depicting an exemplary color electronic printing system incorporating the warranted performance sensors and dynamic job recovery system according to the invention.
Figure 5:
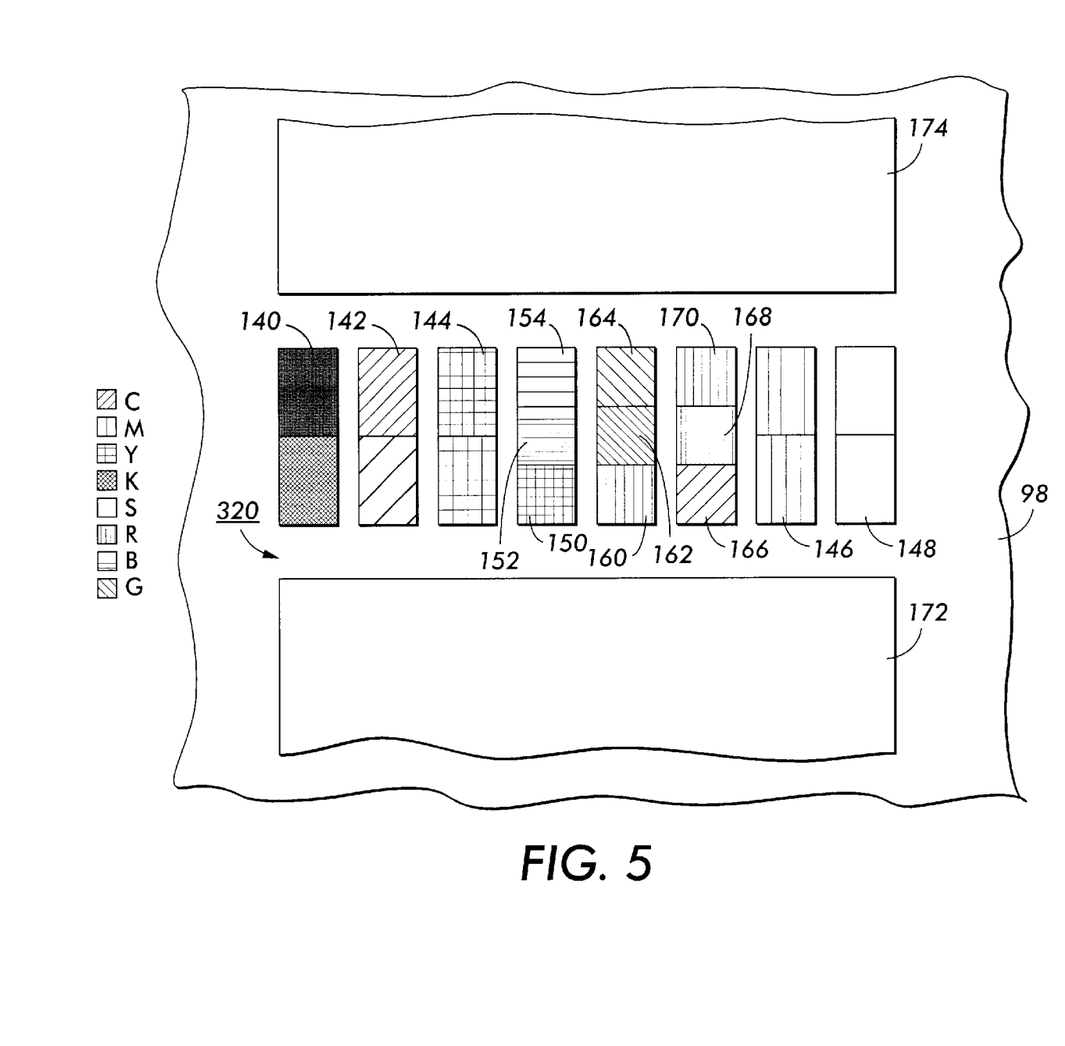
FIG. 5 is a partial view showing an interpage zone (IPZ) of a photoreceptor containing test patches according to the invention.

Referring now to the drawings, and particularly to FIGS. 1–5 thereof, there are shown two exemplary laser based electronic reprographic printing systems for processing print jobs in accordance with the teachings of the present invention. FIGS. 1–3 illustrate a single color or monochrome printer, while FIGS. 4–5 illustrate a full-color printer.

Referring back to FIGS. 1–2, printing system 2, for purposes of explanation, is divided into a scanner section 6, controller section 7, and printer section 8. While a specific printing system is shown and described, the present invention may be used with other types of printing systems such as ink jet, ionographic, etc. Moreover, while shown as a reprographic printing system (digital copier), the invention equally applies to technologies that only provide printing since image quality integrity is desirable in each. Thus, while image signals are obtained by scanning in this embodiment, they could alternatively be supplied by a computer network to a controller of printer section 8.

Referring particularly to FIGS. 2–3, scanner section 6 incorporates a transparent platen 20 on which the document 22 to be scanned is located. One or more linear arrays 24 are supported for reciprocating scanning movement below platen 20. Array 24 provides image signals or pixels representative of the image scanned which, after suitable processing by processor 25, are output to controller section 7.

Processor 25 converts the analog image signals output by array 24 to digital and processes the image signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40, document feed rolls 41 and document feed belt 42 onto platen 20 where the document is scanned by array 24. Following scanning, the document is removed from platen 20 by belt 42 and returned to tray 37 by document feed rolls 44 or output to output tray 48 based on diverter 10.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and, for purposes of explanation, is separated into a Raster Output Scanner (ROS) section 87, Print Module Section 95, Paper Supply section 107, and Finisher 120. ROS 87 has a laser 91, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 as will appear may comprise any of a variety of sheet sizes, types, and colors. For transfer, the print media is brought forward in timed registration with the developed image on photoreceptor 98 from either a main paper tray 110 or from auxiliary paper trays 112, or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Referring to FIGS. 1 and 2, controller section 7 is, for explanation purposes, divided into an image input controller 50, User Interface (UI) 52, system controller 54, main memory 56, image manipulation section 58, image output controller 60, and integrity controller 70.

The scanned image data input from processor 25 of scanner section 6 to controller section 7 is compressed by image compressor/processor 51 of image input controller 50. As the image data passes through compressor/processor 51, it is segmented into slices N scanlines wide, each slice having a slice pointer. The compressed image data together with slice printers and any related image descriptors providing image specific information (such as height and width of the document in pixels, the compression method used, pointers to the compressed image data, and pointers to the image slice pointers) are placed in an image file. The image files, which represent different print jobs, are temporarily stored in a system memory such as a Random Access Memory (RAM) pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point a cursor to the item selected and keying the mouse.

Main memory 56 has plural hard disks 90-1, 90-2, 90-3 for storing machine Operating System software, machine operating data, and the scanned image data currently being processed. When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 where the additional processing steps such as collation, make ready, decomposition, etc., are carried out. Following processing, the data may be returned to main memory 56, sent to UI 52 for display on touchscreen 62, or sent to image output controller 60.

For a more detailed understanding of conventional controller features of the electronic reprographic printing system, see U.S. Pat. No. 5,179,410, commonly assigned to the same assignee as the present invention and incorporated herein by reference in its entirety.

System 2 has the capability to detect and correct for various faults. Upon detection of a fault, system 2 will take the appropriate actions defined for each individual fault or simply take the worst case action for cases where multiple faults are detected. Dynamic printer job recovery without cycle down is initiated upon detection of various detected faults. Of particular importance is dynamic recovery from detection of various variable data content or image quality aspects of each print job while the system is in a customer job mode. Such detection and control are achieved by provision of various warranted performance sensors 190,195 illustrated in FIG. 3 and integrity controller 70 illustrated in FIG. 2.

Integrity controller 70 receives signals from sensors 190, 195 and monitors the warranted performance of each customer print job during execution. Warranted performance includes both variable data content integrity as well as image quality attributes during a customer print job being within acceptable specifications. Integrity controller 70 may be a separate personal computer with real time communications to system 2, may be a separate processor board with real time communications to the controller 7 and printer 8, or may be a collection of logical functions executed by existing control boards on controller 7 or printer 8.

Sensor 190 is a variable data sensor that senses the integrity of each sheet of a customer print job from encoding which may be printed on the sheet as a glyph or bar code. This glyph or bar code is a print integrity identifier that contains details about the particular page being printed. Such glyphs may contain information about each page of a customer print job, such as, for example, record number, page sequence, needed logos or other associated graphics, image content, assembly information, etc. This information thus contains details necessary to determine variable data content integrity of the print job.

A suitable sensor 190 is an imaging device such as a camera or scanner capable of sensing the particular glyph or bar code used. Suitable sensors are commercially available, such as a Microscan MS-911 bar code reader or a Sony XC-55BB CCD camera with appropriate image capture electronics. The image captured by sensor 190 is fed to a decoding algorithm dependent upon the particular glyph or bar code used, which algorithm analyses the print integrity identifier present and determines which pages of a document have or have not been printed within a variable data job and other information relating to content integrity. This information ultimately is used to determine whether a particular customer print job has been completed properly. That is, even though a print job may contain 5 pages and 5 pages are printed, the print job integrity identifier information ensures that what is output is complete and correct.

Sensor 195 is a warranted performance sensor that senses control patches printed in an interpage zone on the photoreceptor belt of the printer. Suitable control patches and sensors used to sense such patches may be found in U.S. Pat. Nos. 6,181,888 to Scheuer et al.; 6,204,869 to Raker et al.; 5,287,162 to de Jong et al.; and 5,748,221 to Castelli et al., all of which are commonly assigned to the same assignee as the present invention and incorporated herein by reference in their entireties. Sensor 195 is provided to ensure that the resultant print job output is of acceptable image quality. It does so by monitoring image quality attributes such as color uniformity, color stability, image registration, and color-to-color registration (when printing with multiple colors such as in the exemplary second embodiment of FIGS. 4–5, which will be described in more detail below).

In addition to the illustrative monochrome printer 2 shown in FIGS. 1–3, the invention may also be practiced using a highlight or full color electronic reprographic printer as well, such as the full color printer 2' illustrated in FIGS. 4–5. As in the first embodiment, an original document 22 can be positioned in a document handler 35 on a Raster Input Scanner (RIS) 6. However, other types of scanners may be substituted for RIS 6. Alternatively, image signals may be supplied by a computer network 220 to controller 54. RIS 6 captures the entire original document and converts it to a series of raster scan lines or image signals. As with the previous embodiment, this information is transmitted to a system controller 54. The image-processing controller 60 receives the document information from the controller 54 and converts this document information into electrical signals for use by a raster output scanner.

The printing machine preferably uses a charge retentive surface in the form of a photoreceptor belt 96 supported for movement in the direction indicated by arrow X, for advancing sequentially through various xerographic process stations. The photoreceptor belt 96 is entrained about a drive roller 228, tension roller 230, and fixed roller 232. The drive roller 228 is operatively connected to a drive motor 234 for effecting movement of the photoreceptor belt 96 through the xerographic stations. In operation, as the photoreceptor belt 96 passes through charging station A, a corona generating arrangement, indicated generally by the reference numeral 236, charges the photoconductive surface of photoreceptor belt 96 to a relatively high, substantially uniform, potential. The corona discharge arrangement preferably comprises an AC scorotron and a DC dichorotron having grid elements to which suitable voltages are applied. Target values for these voltages dependent on a particular machine requirement are stored in Non Volatile Memory (NVM).

Next, photoconductive surface 96 is advanced through an imaging/exposure station B. As the photoreceptor passes through the imaging/exposure station B, the controller receives image signals representing the desired output image from Raster Input Scanner 6 or computer network 220 and processes these signals to convert them to the various color separations of the image. The desired output image is transmitted to a laser based output scanning device, which causes the uniformly charged surface of the photoreceptor belt 96 to be discharged in accordance with the output from the scanning device. Preferably the laser based scanning device is a laser Raster Output Scanner (ROS) 87. Alternatively, the ROS 87 could be replaced by other xerographic exposure devices such as an LED array.

The photoreceptor belt 96, which is initially charged to a voltage V0, undergoes dark decay to a level equal to about −500 volts. When exposed at the exposure station B, it is discharged to a residual voltage level equal to about −50 volts. Thus after exposure, the photoreceptor belt 24 contains a monopolar voltage profile of high and low voltages, the former corresponding to charged areas and the latter corresponding to discharged or background areas. The low voltage portions are developed using Discharged Area Development.

At a first development station C where a first separation image is developed a first development station C comprising any type of development system even a magnetic brush development system may be used. Preferably a hybrid scavengeless development system including a developer structure 240 is utilized. A hybrid scavengeless development system provides the ability to develop downstream toners without scavenging toners already placed on the photoreceptor by the development of upstream image separations. Hybrid scavengeless development systems are preferably used in development stations subsequent to station C because other developer system would interact with a previously developed. A hybrid scavengeless development system utilizes a standard magnetic brush development system to place charged toner on two donor rolls. A set of wires is located between the donor rolls and the photoreceptor. AC and DC fields are established on the donor and wires to create a powder cloud of toner near the photoreceptor.

The developer structure 240 contains, for example, magenta toner particles 242. The powder cloud causes charged magenta toner particles 242 to be attracted to the electrostatic latent image. Appropriate developer biasing is accomplished via a power supply (not shown). This type of development system is a hybrid scavengeless type in which only toner particles (magenta, for example) are attracted to the latent image and there is no mechanical contact between the photoreceptor belt 96 and the toner delivery device which would disturb a previously developed, but unfixed, image. A toner concentration sensor 244 senses the toner concentration in the developer structure 240. A dispenser 246 dispenses magenta toner into the developer structure 240 to maintain a proper toner concentration. The dispenser 246 is controlled via controller 54.

The developed but unfixed or non-fused image is then transported past a second charging device 248 where the photoreceptor belt 96 carrying the previously developed magenta toner image areas is recharged to a predetermined level. The charging device 248 comprises a split recharge system, wherein both a direct and an alternating current charging device, are used. The split recharge system requires that the electrostatic controls for each separation be maintained within the confines of the charge, expose, and develop steps within the image separations.

In this exemplary embodiment, five separate ESV sensors 249, 250, 252, 254 and 256 are provided, one for each development housing structure. Each ESV is mounted on the upstream end of the developer housing structure with which it is associated such that they sense photoreceptor voltage prior to image development. The ESVs monitor the exposed voltages but do not directly control them. The ESV 249 is mounted on one end of the developer housing structure 240 in a position that is intermediate the ROS 87 and a developer roll forming a part of that housing structure.

A second exposure/imaging is performed by a device 258 preferably comprising a laser based output structure. The device 258 is utilized for selectively discharging the photoreceptor belt on toned and/or untoned image areas of the photoreceptor, in accordance with the image information being processed. Device 258 may be a Raster Output Scanner or LED bar, which is controlled by controller 54 or network computer 20. At this point, the photoreceptor belt 96 may contain toned and untoned image areas at relatively high voltage levels and toned and untoned areas at relatively low voltage levels. Low voltage areas represent image areas that will be developed using Discharged Area Development (DAD) while high voltage areas are areas that will remain untoned. A suitably charged, developer material comprising the second color toner 264, preferably yellow, is employed. The second color toner is contained in a developer structure 262 disposed at a second developer station D and is presented to the latent electrostatic images on the photoreceptor belt by way of a second developer system. A power supply (not shown) serves to electrically bias the developer structure 262 to a level effective to develop the appropriate image areas with charged yellow toner particles 264. Further, a toner concentration sensor 266 senses the toner concentration in the developer structure 262. A toner dispenser 268 dispenses yellow toner into the developer structure 262 to maintain a proper toner concentration. The dispenser 268 is controlled via controller 54.

The above procedure is repeated for a third image for a third suitable color toner such as cyan 270 contained in developer structure 272 (station E), and for a fourth image and suitable color toner such as black 278 contained in a developer structure (station F). Toner dispensers 276 and 282 serve to replenish their respective development systems.

A fifth imaging station G is provided with a developer structure 282 containing a spot toner 284 of any suitable color for use in extending the color gamut of this image processor. Toner replenishment is effected using a toner dispenser 286. Preferably, developer systems 242, 262, 272, 280 and 282 are the same or similar in structure. Also, preferably, the dispensers 244, 268, 276, 282 and 286 are the same or similar in structure.

Each of the sensors (ESVs) 250, 252, 254 and 256 is positioned intermediate the ROS and the developer roll of the developer housing structure with which it is associated, as shown at the development stations.

The composite image developed on the photoreceptor belt 96 consists of both high and low charged toner particles, therefore a pre-transfer corona discharge member 288 is provided to condition all of the toner to the proper charge level for effective transfer to a substrate 290 using a corona discharge device exhibiting a predetermined discharge of the desired polarity.

Subsequent to image development, a sheet of support material 290 is moved into contact with the toner images at transfer station H. The sheet of substrate material 290 is advanced to transfer station H from a supply unit 110 in the direction of arrow 294. The sheet of support material 290 is then brought into contact with photoconductive surface of photoreceptor belt 96 in a timed sequence so that the toner powder image developed thereon contacts the advancing sheet of support material 290 at transfer station H.

Transfer station H includes a transfer corona discharge device 296 for spraying ions onto the backside of support material 290. The polarity of these ions is opposite to the polarity of that exhibited by the pretransfer corona discharge device 288. Thus, the charged toner powder particles forming the developed images on the photoreceptor belt 96 are attracted to sheet 290. A detack dicorotron 298 is provided for facilitating stripping of the sheets from the photoreceptor belt 96 as the belt moves over the roller 232.

After transfer, the sheet of support material 290 continues to move onto a conveyor (not shown) which advances the sheet to fusing station I. Fusing station I includes a heat and pressure fuser assembly, indicated generally by the reference numeral 300, which permanently affixes the transferred powder image to sheet 290. Preferably, fuser assembly 300 comprises a heated fuser roller 302 and a backup or pressure roller 304. Sheet 290 passes between fuser roller 302 and backup roller 304 with the toner powder images contacting fuser roller 302. In this manner, the toner powder images are permanently affixed to sheet 290. After fusing, a chute, not shown, guides the advancing sheets 290 to a catch tray, stacker, finisher or other output device (not shown), for subsequent removal from the printing machine by the operator.

After the sheet of support material is separated from photoconductive surface of photoreceptor belt 96, the residual toner particles remaining on the photoconductive surface after transfer are removed at cleaning station 306 using brushes 308.

As in the monochrome printer, controller 54 can regulate the various printer functions. The controller 54 preferably includes one or more programmable controllers, which control printer functions hereinbefore described. The controller 54 may also provide a comparison count of the copy sheets, the number of documents being recirculated, the number of copy sheets selected by the operator, time delays, jam corrections, etc. The control of many of the xerographic systems heretofore described may be accomplished automatically or through the use of a user interface of the printing machine consoles selected by an operator. Conventional sheet path sensors or switches may be utilized to keep track of the position of the document and the copy sheets.

As is the case in of all print engines of the type disclosed, the photoreceptor 96 may contain a plurality of Interpage Zone (IPZ) frames 320 (FIG. 5). IPZ refers to the space between successive toner powder images formed on the photoreceptor 96. Each IPZ contains patches to be read by the five ESVs 249, 250, 252, 254 and 256 and by three Extended Toner Area Coverage Sensor (ETACS) 322, 324 and 326, which can serve as warranted performance sensors, comparable to sensors 190, 195 in the first embodiment. The ETACS are positioned downstream of the last developer structure 282 and upstream of the pretransfer corona device 288. Outputs from the ETACS sensors are used in controlling, by way of example, the corona discharge devices 236 and 248. The ETACS measure the mass of toner per unit area on a photoconductive or image bearing surface. Such measurement can provide a good indicator of the marking process stability up to the ETAC location in the printing system. If multiple ETACS are used inboard to outboard, they can monitor the uniformity of the marking process inboard to outboard. As such, these ETACS 322, 324 and 326 can be used to detect various image quality attributes and warranted performance of the resultant print job.

In this exemplary embodiment, each frame or IPZ contains two untoned or undeveloped patch areas for use with each of the five ESVs and three toned or developed patch areas for use with each of the three ETACS for a total of nineteen patches. The untoned and undeveloped ESV patches consist of two patches 140 black for black, two patches 142 for cyan, two patches 144 for yellow, two patches 146 for magenta and two patches 148 for the spot color.

By way of example, toned patches to be sensed by the ETACS may comprise one set of three patches comprising a toned patch 150 consisting of only yellow toner and two toned complementary patches 152 and 154 consisting of a blue (magenta plus cyan) patch and dark spot (black plus spot) patch, respectively. A second set of three toned patches may comprise a patch 160 consisting of magenta toner and a pair of toned complementary patches comprising a green (cyan plus yellow) patch 162 and a dark spot (black plus spot) patch 164. The third set of three patches may comprise a patch 166 consisting of cyan toner and a pair of complementary patches comprising a red (magenta plus yellow) patch 168 and a dark spot (black plus spot) patch 170. The patches are disposed in IPZs 120 intermediate full color image areas 172 and 174. However, any size, shape and number of patches may be used, so long as they can be representative of an image quality attribute.

Generally, the various warranted performance sensors 195, 322, 324, and 326 monitor variable data image quality relevant to maintaining image quality control of the current print job by sensing a particular control test patch or other indicator of one or more image quality attributes. Other warranted performance sensors could be used. For example, U.S. Pat. No. 5,287,162 to de Jong, the disclosure of which is incorporated by reference herein in its entirety, measures chevrons on the photoconductive member or other image bearing member, which can serve as an indicator of warranted performance and image quality. Alternatively, the multi-function sensor in U.S. Pat. No. 5,748,221 to Castelli et al., the subject matter of which is also incorporated herein by reference in its entirety, measures fused images on a media, which can also serve as an indicator of warranted performance and image quality.

With the inventive electronic printing system 2 or 2' in the above embodiments, print jobs are programmed in a Job Program mode in which there is displayed on touchscreen 62 a Job Ticket and a Job Scorecard for the job being programmed. The Job Ticket displays various job selections programmed while the Job Scorecard displays basic instructions to the system for printing the job.

When system 2 (or 2') is in a customer print job mode, the various sensors monitor print job integrity and image quality. More particularly, these sensors monitor variable data content and image quality attributes at the time of printing to ensure warranted performance of the resultant output. Individual print quality attributes, such as color uniformity, color-to-color registration, color stability and the like each have a predefined specification depending on the particular application. That is, each attribute has a predefined acceptable range of values, which include optimal values and acceptable deviations (tolerances) from optimal. When detected attributes are within such specifications, processing of a customer print job continues. However, if one or more detected attributes are out of range (out of specification), an image quality fault problem will be signaled. Similarly, when sensors detect a problem with variable data content integrity, such as incomplete image content, improper page sequence, incorrect linking to graphics such as logos or headers, a similar fault condition will be signaled.

Figure 6:
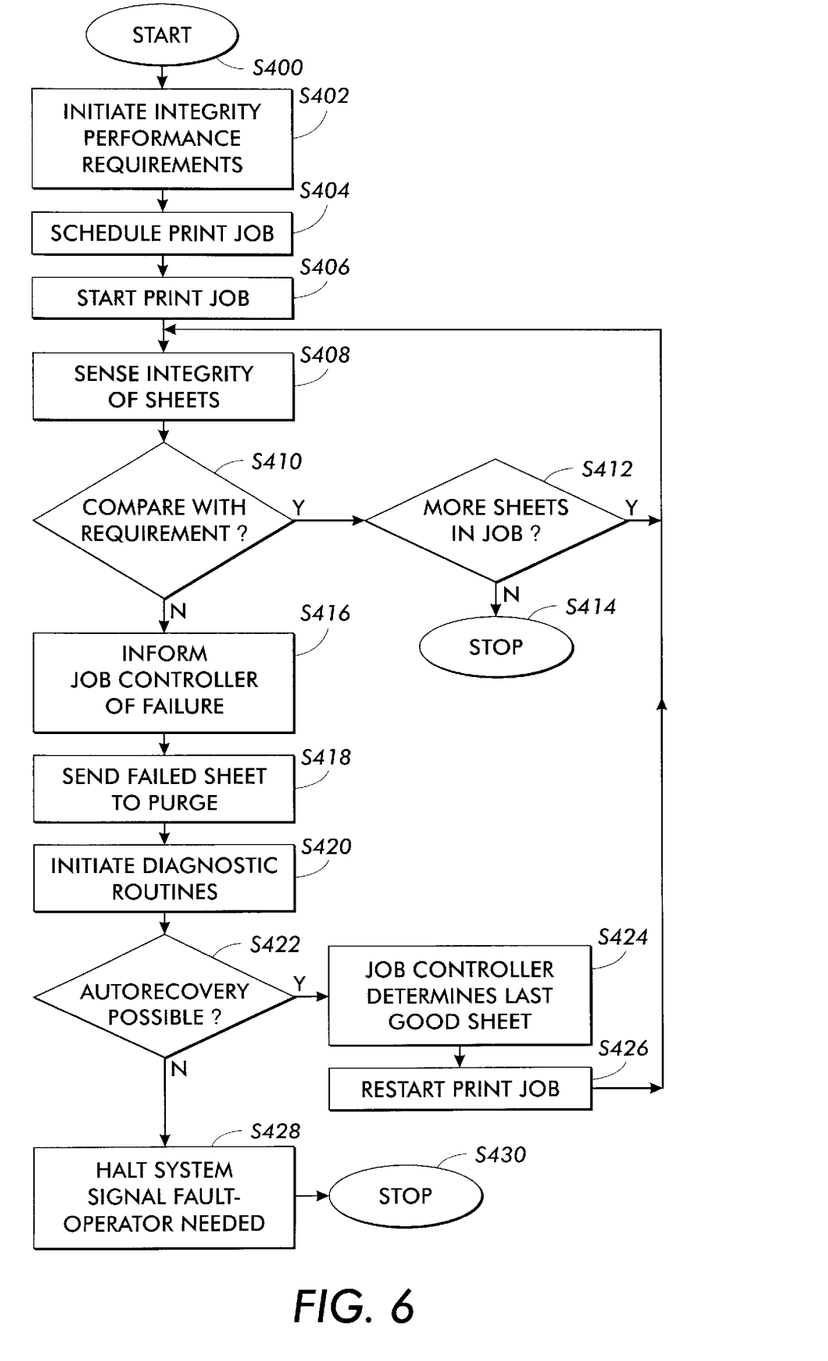
FIG. 6 is a flowchart depicting the operation of an electronic reprographic printing system during processing of a customer print job, including detection of sheets having images of questionable integrity or quality.

FIGS. 6–9 depict exemplary operation of the electronic printing system. In FIG. 6, there is shown a flow chart depicting a basic operation of system 2, including performance of dynamic job recovery. The process starts at step S400 and proceeds to step S402 where integrity and performance requirements are initialized, such as at initial job control communication. Warranted performance requirements may be specified for the job, for example, the color measurement of each control patch of a specified color must be in a range less than 3 delta E from a specified calorimetric value. Another example of a warranted performance requirement for the job would be: the color-to-color registration of each control patch must have less than 90 microns difference in positioning of each color relative to the specified reference color. For variable data content integrity, the requirement may be specified as a list of values corresponding to the expected integrity descriptor for each sheet to be produced in order, for example: record 101, page 1, record 101 page 2, record 102, page 1, record 102, page 2, record 103, page 1, record 103, page 2, etc. However, the requirements may be user modified at various times during operation of system 2. From step S402, flow advances to step S404 where a print job is scheduled. From step S404, flow proceeds to step S406 where a first customer print job is started. During this step, various individual sheets to be printed are fed and transported through printer section 8. During this transportation, integrity and image quality of the various sheets are monitored at step S408 by sensors 190, 195 in the first embodiment and by sensors 190, 322, 324 and 326 in the second embodiment reading glyphs, barcodes or control patches on the individual sheets themselves, or control patches provided on interpage zones.

At step S410, the sensed warranted performance values are judged to see if they are acceptable. In the case of image quality attributes being sensed, the detected values are compared with the requirements initialized at step S402. In the case of variable data content integrity values, these are compared with known content values to determine whether various sheets of a particular print job have proper integrity. If the detected values are acceptable, flow advances to step S412 where the print job processing continues and it is determined whether the print job is complete. If so, the process proceeds to step S414 and stops. However, it additional sheets require processing, flow returns to step S408 where sensing continues.

If, however, at step S410 the comparison is not acceptable, such as by one or more of the various sensed attributes or content identifiers being out of acceptable bounds, a warranted performance fault is indicated and flow advances to step S416 where the job controller is informed of the failure of warranted performance. From step S416, flow advances to step S418 where the current sheet (failed sheet) is sent to a specified purge tray or other disposal location. If subsequent upstream sheets have been started, these too may be purged.

From step S418, flow advances to step S420 where without cycling down the system job controller initiates one or more diagnostic routines as part of an attempt to perform autorecovery. That is, whether the system is capable of diagnosing and self-correcting the detected warranted performance fault and automatically reinitiate completion of the current print job. Any diagnostic prints made during the diagnostic routine are also sent to the purge tray. If the diagnostics identify the problem and the problem is fixed without operator intervention at step S420, flow advances to step S422 and S424 where the job controller determines the last good sheet. Then, at step S426 the print job is restarted where it left off. That is, the next sheet that has not been properly completed to satisfaction is again reprinted along with any other remaining sheets. Once the print job is restarted, flow returns to step S408 where the integrity of processed sheets are again sensed. If, however, at step S422 it is determine that autorecovery is not possible, flow advances from step S422 to step S428 where the system is haulted and a signal for operator intervention is triggered. From step S428, flow advances to step S430 where the process stops.

Figure 7:
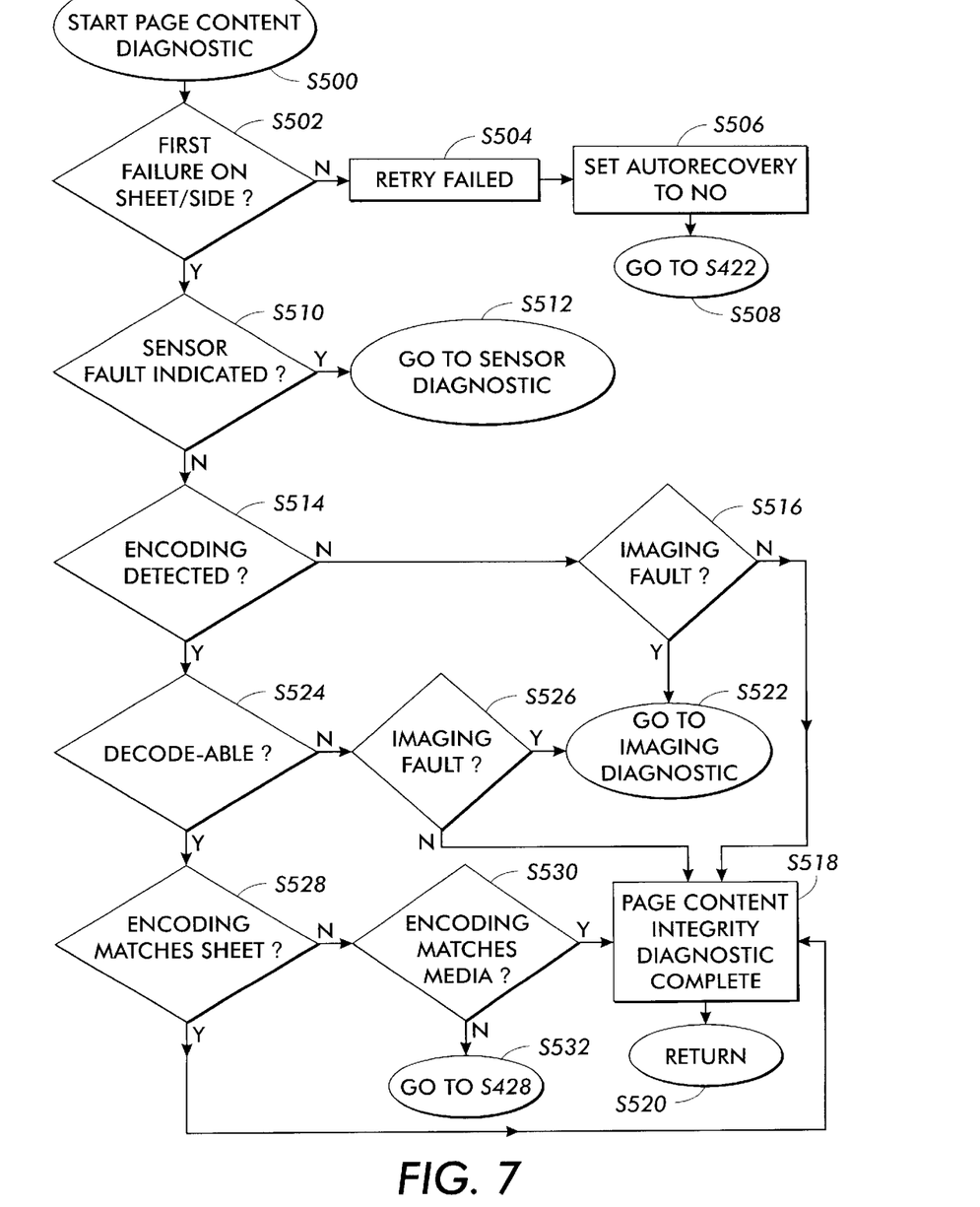
FIG. 7 is a flowchart illustrating an exemplary page content integrity diagnostic routine.

FIG. 7 is an exemplary diagnostic subroutine performed during step S420 to determine page content integrity. This diagnostic is performed based on the detected content integrity obtained from sensor 190 detecting glyphs or bar codes on individual sheets of a print job. The subroutine starts at step S500 and advances to step S502 where it is determined whether this is the first failure for this particular sheet/side. If not, flow advances to step S504 where it is indicated that retry has again failed. This prevents the system from going into an infinite loop of retry. From step S504, flow advances to step S506 where an autorecovery indicator is set to no. Flow then advances to step S508, where the subroutine returns to step S422 of FIG. 6.

If, however, at step S502 it is determined that this is the first failure, flow advances from step S502 to step S510 where it is determined whether there is a sensor fault. If so, flow advances to step S512 where a suitable sensor diagnostic is performed depending on the particular sensor being used. If no sensor fault is indicated, flow advances from step S510 to step S514 where it is determined whether encoding is detected. That is, whether a particular page content integrity identifier such as a glyph or bar code or control patch has been detected. If not, flow advances to step S516 where it is determined whether there has been an imaging fault. That is, if there was no sensor fault and no glyph or bar code detected, presence of a fault from the image path (image data did not arrive) or from the marking system (encoded image did not get marked with toner) are detected at step S516. If none are found, flow advances to step S518. However, if marking or imaging faults are found, flow advances from step S516 to step S522 where an imaging and marking diagnostic routine is initiated, depending on the particular imaging and marking system being used.

If, however, at step S514 encoding is detected, flow advances to step S524 where it is determined whether the detected encoding can be properly decoded. If not, flow advances to step S526 where it is determined whether an imaging or marking fault are present. If decoding is possible, flow advances from step S524 to step S526 where it is determined whether the encoding matches the indicated individual sheet/side. If the encoding does not match the sheet/side requirement, there may be a set of failures such as incorrect media present which require operator intervention to remedy (provide proper media in tray). If such encoding does not match, flow advances to step S530 where media matching is determined. If a match, flow advances to step S518. If not, it is determined that media is improper, which requires operator intervention to remedy. As such, flow advances to step S532 where the subroutine returns to step S428 of FIG. 6. At step S518, the page content integrity diagnostic is completed and the subroutine returns at step S520 back to step S422 in FIG. 6.

Figure 8:
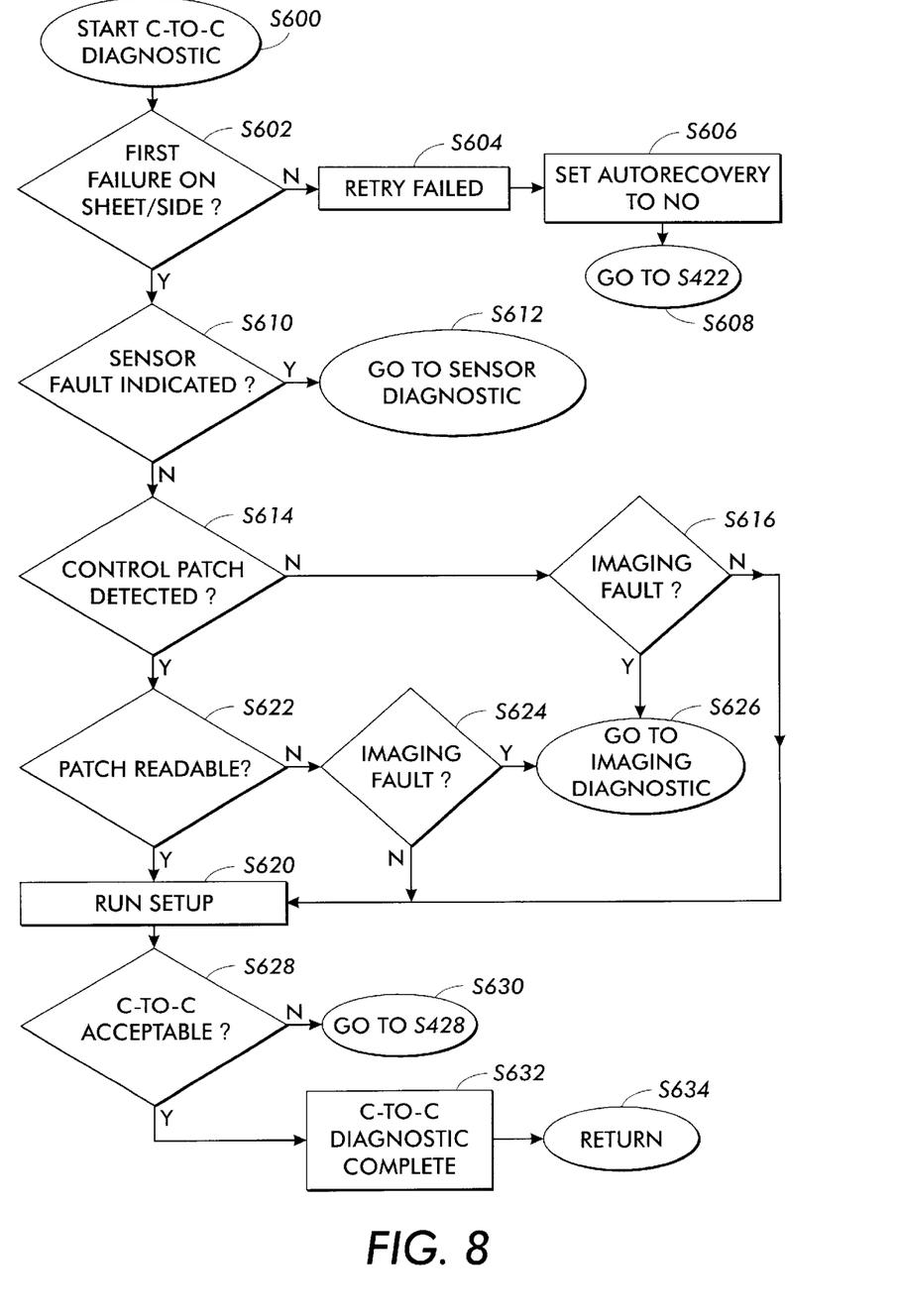
FIG. 8 is a flowchart illustrating an exemplary color-to-color registration diagnostic routine.

FIG. 8 is an exemplary diagnostic subroutine performed during step S420 to determine color-to-color registration. This diagnostic is performed based on the detected color test patches generated either in the margins of the individual sheets or on special monitoring sheets interspersed with the customer job or in interpage zones of the marking engine (photoreceptor) obtained from one or more sensors that detect the patch. The subroutine starts at step S600 and advances to step S602 where it is determined whether this is the first failure for this particular sheet/side. If not, flow advances to step S604 where it is indicated that retry has again failed. This prevents the system from going into an infinite loop of retry. From step S604, flow advances to step S606 where an autorecovery indicator is set to no. Flow then advances to step S608, where the subroutine returns to step S422 of FIG. 6.

If, however, at step S602 it is determined that this is the first failure, flow advances from step S602 to step S610 where it is determined whether there is a sensor fault. If so, flow advances to step S612 where a suitable sensor diagnostic is performed depending on the particular sensor being used. If no sensor fault is indicated, flow advances from step S610 to step S614 where it is determined whether a control patch is detected. If not, flow advances to step S616 where it is determined whether there has been an imaging fault. That is, if there was no control patch detected, presence of a fault from the image path (image data did not arrive) or from the marking system (encoded image did not get marked with toner) are detected at step S616. If none are found, flow advances to step S620. However, if marking or imaging faults are found, flow advances from step S616 to step S626 where an imaging and marking diagnostic routine is initiated, depending on the particular imaging and marking system being used.

If, however, at step S614 a control patch is detected, flow advances to step S622 where it is determined whether the patch can be properly read. If not, flow advances to step S624 where it is determined whether an imaging or marking fault are present. If reading is possible, flow advances from step S622 to step S620 where a run setup procedure is initiated. This may be the same setup initiated at machine startup. Upon setup completion, another control patch may be printed and sensed, either on a new diagnostic sheet or on the interpage zone. This is then tested and at step S628 it is determined whether the color-to-color registration is acceptable (i.e., within specified tolerances). If not, operator intervention or a service repair are necessary and flow advances to step S630 where the process returns to step S428 of FIG. 6. If, however, the color-to-color registration is now acceptable, flow advances to step S632 and the color-to-color registration diagnostic is considered completed (with any diagnostic sheets generated being transported to the purge tray). From step S632 the process advances to step S634 where the subroutine returns back to step S422 in FIG. 6.

Figure 9:
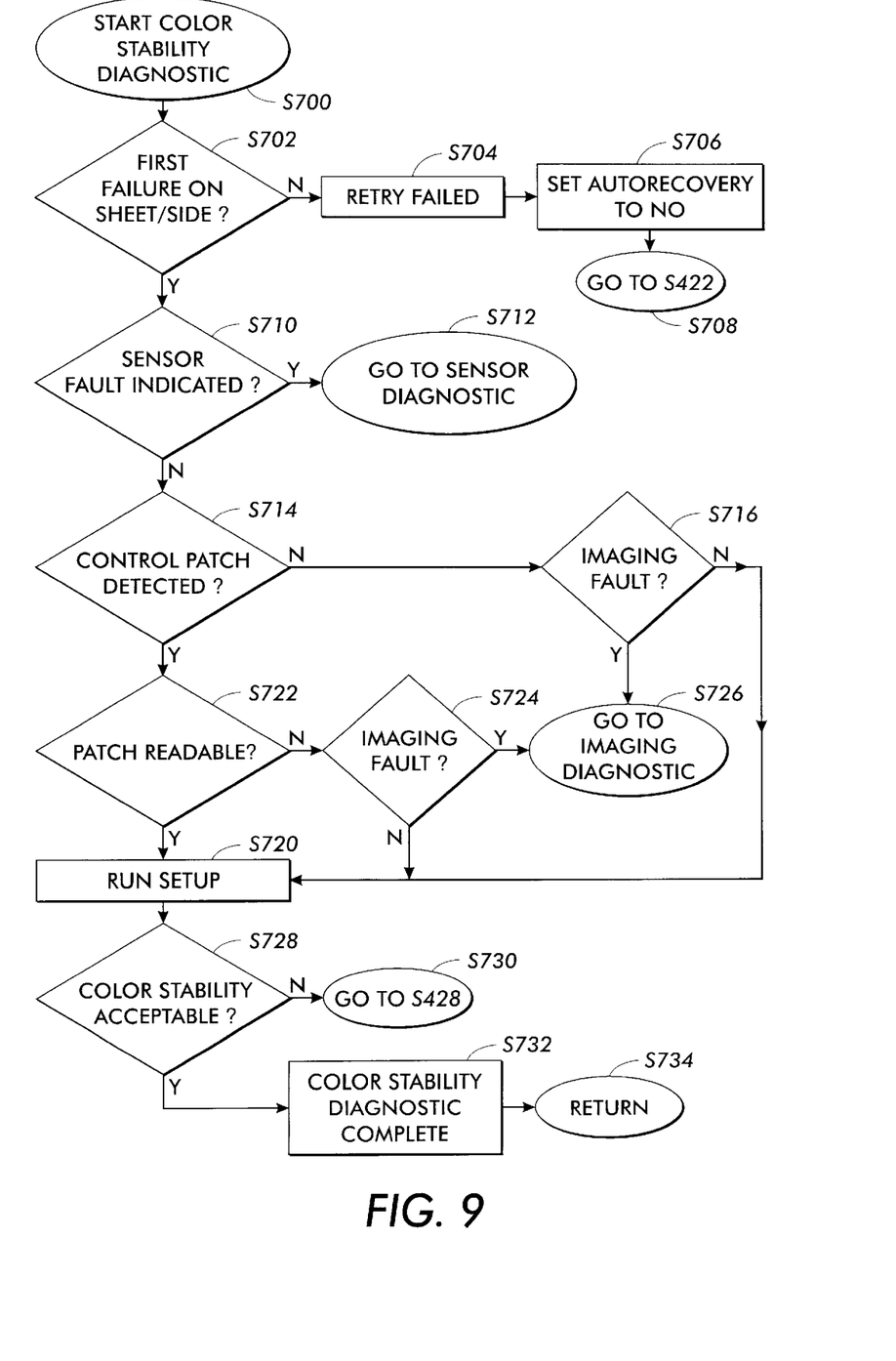
FIG. 9 is a flowchart illustrating an exemplary color stability diagnostic routine.

FIG. 9 is an exemplary diagnostic subroutine performed during step S420 to determine color stability. This diagnostic is also performed based on the detected color test patches generated either in the margins of the individual sheets or on special monitoring sheets interspersed with the customer job or in interpage zones of the marking engine (photoreceptor) obtained from one or more sensors that detect the patch. The subroutine starts at step S700 and advances to step S702 where it is determined whether this is the first failure for this particular sheet/side. If not, flow advances to step S704 where it is indicated that retry has again failed. This prevents the system from going into an infinite loop of retry. From step S704, flow advances to step S706 where an autorecovery indicator is set to no. Flow then advances to step S708, where the subroutine returns to step S422 of FIG. 6.

If, however, at step S702 it is determined that this is the first failure, flow advances from step S702 to step S710 where it is determined whether there is a sensor fault. If so, flow advances to step S712 where a suitable sensor diagnostic is performed depending on the particular sensor being used. If no sensor fault is indicated, flow advances from step S710 to step S714 where it is determined whether a control patch is detected. If not, flow advances to step S716 where it is determined whether there has been an imaging fault. That is, if there was no control patch detected, presence of a fault from the image path (image data did not arrive) or from the marking system (encoded image did not get marked with toner) are detected at step S716. If none are found, flow advances to step S720. However, if marking or imaging faults are found, flow advances from step S716 to step S726 where an imaging and marking diagnostic routine is initiated, depending on the particular imaging and marking system being used.

If, however, at step S714 a control patch is detected, flow advances to step S722 where it is determined whether the patch can be properly read. If not, flow advances to step S724 where it is determined whether an imaging or marking fault are present. If reading is possible, flow advances from step S722 to step S720 where a run setup procedure is initiated. This may be the same setup initiated at machine startup. Upon setup completion, another control patch may be printed and sensed, either on a new diagnostic sheet or on the interpage zone. This is then tested and at step S728 it is determined whether the color stability is acceptable (i.e., within specified tolerances). If not, operator intervention or a service repair are necessary and flow advances to step S730 where the process returns to step S428 of FIG. 6. If, however, the color stability is now acceptable, flow advances to step S732 and the color stability diagnostic is considered completed (with any diagnostic sheets generated being transported to the purge tray). From step S732 the process advances to step S734 where the subroutine returns back to step S422 in FIG. 6.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims. For example, the specific subroutines described are representative. The teachings of this invention clearly apply to other identifiable aspects of page content integrity and image quality that can be sensed by a sensor and corrected by an autorecovery process, such as paper feed timing mismatch with delivery of image data, double sheet feed or no sheet feed. Also, the invention may extend beyond the printing aspect to encompass other related peripheral components of an overall print job, such as finishing systems or stations (binders, collators, staplers, etc.).

What is claimed is:

1. A method for dynamic job recovery in an electronic printing system comprising the steps of:
   automatically detecting the presence of a printed sheet in a customer print job having a warranted performance problem with one of variable data content integrity and image quality during production of the customer print job;
   automatically purging specified sheets to a specified purge location upon said detection, said purging step including initiating purging at a specific sheet with respect to a first sheet detected having an image thereon with the warranted performance problem;
   initiating a warranted performance diagnostic routine to isolate and correct the warranted performance problem; and
   initiating dynamic job recovery upon completion of the diagnostic routine without cycling down of the electronic printing system and without operator intervention, said dynamic job recovery including assessing job completion progress of all partially completed jobs and starting recovery job scheduling without specific direction to provide a completed customer print job with content integrity and acceptable image quality,
   wherein said detection of a warranted performance problem includes monitoring variable data content integrity monitors.

2. The method as recited in claim 1, wherein said step of automatically purging includes initiating purging at the first sheet detected having an image thereon with a loss of integrity.

3. The method as recited in claim 1, wherein said step of initiating job recovery includes recovering to the correct sheet to complete a job being printed.

4. The method as recited in claim 1, wherein said purging step includes purging up to three sheets in advance of the first sheet.

5. The method as recited in claim 1, wherein said indicator is a glyph provided on one or more printed sheets of the customer print job.

6. The method as recited in claim 1, wherein said indicator is a bar code provided on one or more printed sheets of the customer print job.

7. The method as recited in claim 1, wherein said indicator is indicative of record number.

8. The method as recited in claim 1, wherein said indicator is indicative of variable data image content.

9. The method as recited in claim 1, wherein said indicator is indicative of one of header and logo details.

10. The method as recited in claim 1, wherein the electronic printing system includes a finishing system, and the dynamic recovery recovers from warranted performance problems in the finishing system.

11. A method for dynamic job recovery in an electronic printing system comprising the steps of:
    automatically detecting the presence of a printed sheet in a customer print job having a warranted performance problem with one of variable data content integrity and image quality during production of the customer print job;
    automatically purging specified sheets to a specified purge location upon said detection, said purging step including initiating purging at a specific sheet with respect to a first sheet detected having an image thereon with the warranted performance problem;
    initiating a warranted performance diagnostic routine to isolate and correct the warranted performance problem; and
    initiating dynamic job recovery upon completion of the diagnostic routine without cycling down of the electronic printing system and without operator intervention, said dynamic job recovery including assessing job completion progress of all partially completed jobs and starting recovery job scheduling without specific direction to provide a completed customer print job with content integrity and acceptable image quality, wherein said detection of a warranted performance problem includes monitoring image quality attributes pertinent to the customer print job and comparison of detected attributes with predetermined image quality specifications, the attributes being monitored being on one or more of an image bearing member of the electronic printing system, the printed sheet, or contained in one or more printed test patches.

12. The method as recited in claim 11, wherein image quality attribute pertains to color uniformity.

13. The method as recited in claim 11, wherein image quality attribute pertains to color-to-color registration.

14. The method as recited in claim 11, wherein image quality attribute pertains to color stability.

15. An apparatus for dynamic job recovery in an electronic printing system comprising:
    at least one warranted performance sensor that automatically detects a warranted performance problem with at least one of variable data content integrity and image quality pertinent to production of a customer print job during such production;
    a purge mechanism that automatically purges specified sheets to a specified purge location upon detection of a warranted performance problem, said purge mechanism initiating purging at a specific sheet with respect to a first sheet detected having the warranted performance problem;
    a controller that initiates a warranted performance diagnostic routine to isolate and correct the warranted performance problem; and
    a controller that initiates dynamic job recovery upon completion of the diagnostic routine without cycling down of the electronic printing system and without operator intervention, said dynamic job recovery including assessing job completion progress of all partially completed jobs and starting recovery job scheduling without specific direction to provide a completed customer print job with content integrity and acceptable image quality, wherein said warranted performance sensor detects a variable data content integrity indicator printed on one or more sheets of the customer print job.

16. The apparatus as recited in claim 15, wherein said warranted performance sensor is a scanner or a camera.

17. An electronic printing system comprising the apparatus of claim 15.

18. The apparatus as recited in claim 15, further comprising a finishing system.

19. An apparatus for dynamic job recovery in an electronic printing system comprising:

- at least one warranted performance sensor that automatically detects a warranted performance problem with at least one of variable data content integrity and image quality pertinent to production of a customer print job during such production;
- a purge mechanism that automatically purges specified sheets to a specified purge location upon detection of a warranted performance problem, said purge mechanism initiating purging at a specific sheet with respect to a first sheet detected having the warranted performance problem;
- a controller that initiates a warranted performance diagnostic routine to isolate and correct the warranted performance problem; and
- a controller that initiates dynamic job recovery upon completion of the diagnostic routine without cycling down of the electronic printing system and without operator intervention, said dynamic job recovery including assessing job completion progress of all partially completed jobs and starting recovery job scheduling without specific direction to provide a completed customer print job with content integrity and acceptable image quality, wherein said warranted performance sensor detects an image quality attribute either printed on one or more sheets of the customer print job or in the form of a printed test patch.

20. The apparatus as recited in claim 19, wherein the test patch is printed on one or more sheets of the customer print job.

21. The apparatus as recited in claim 19, wherein the test patch is printed on an interpage zone of the printing system.

22. The apparatus as recited in claim 19, wherein the printing system has predefined image quality specifications and the diagnostic routine compares detected image quality attributes with corresponding predefined image quality specifications and determines a warranted performance problem when such attributes fall outside of the predefined specifications.

23. The apparatus as recited in claim 22, wherein the detected image quality attribute is color stability.

24. The apparatus as recited in claim 22, wherein the detected image quality attribute is color uniformity.

25. The apparatus as recited in claim 22, wherein the detected image quality attribute is color-to-color registration.

* * * * *